K. J. TOBIN ET AL

Sept. 23, 1930. SIDE DOOR CONSTRUCTION Re. 17,812

2 Sheets-Sheet 1

Original Filed July 23, 1927

-INVENTORS-
KENNETH J. TOBIN
WILLIAM W. DARROW

BY Wilkinson, Huxley, Byron & Knight.

Sept. 23, 1930.
K. J. TOBIN ET AL
SIDE DOOR CONSTRUCTION
Re. 17,812
Original Filed July 23, 1927
2 Sheets-Sheet 2
Fig-4-
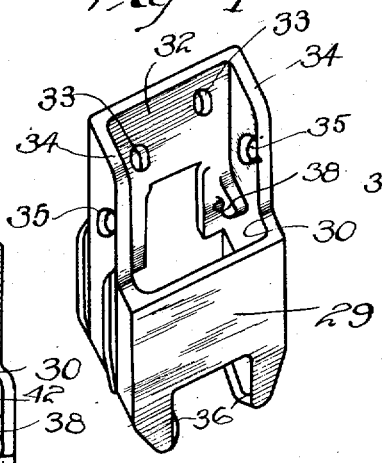
Fig-5-
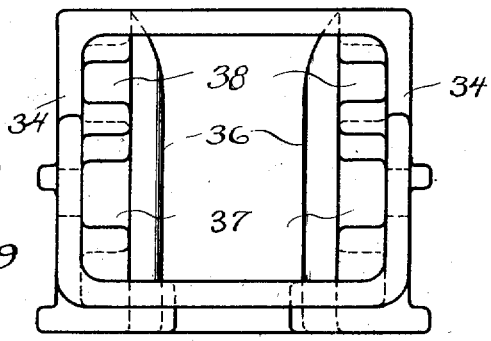
Fig-7-
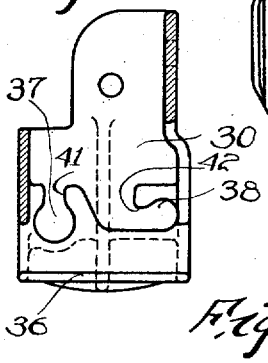
Fig-6
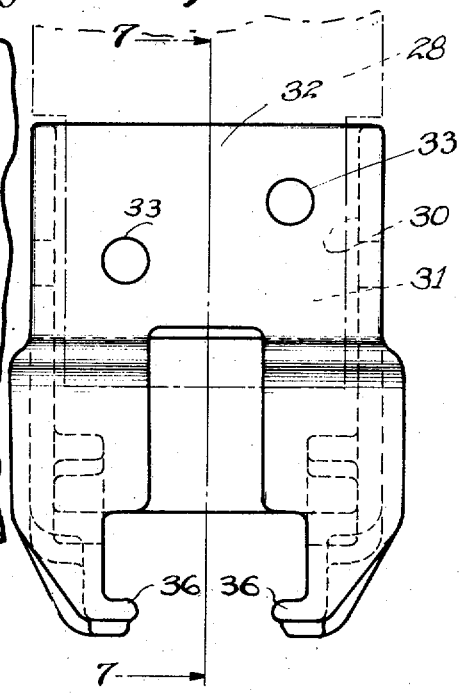
Fig-9-
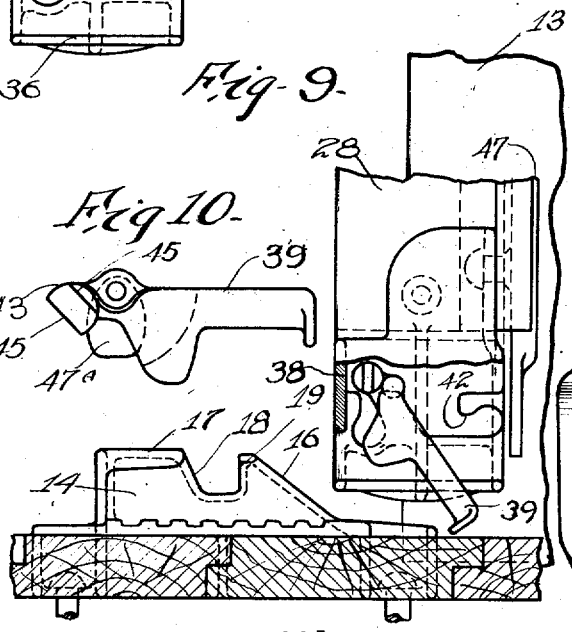
Fig-10-
Fig-8-
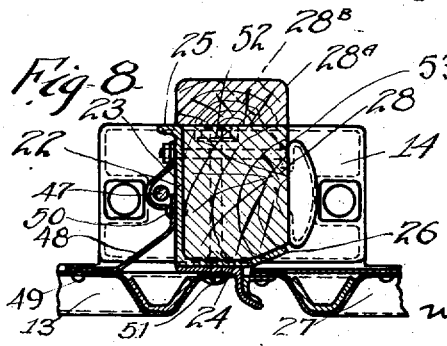
-INVENTORS-
KENNETH J. TOBIN
WILLIAM W. DARROW.
Wilkinson, Huxley, Byron & Knight Reissued Sept. 23, 1930 Re. 17,812

UNITED STATES PATENT OFFICE

KENNETH J. TOBIN AND WILLIAM W. DARROW, OF CHICAGO, ILLINOIS, ASSIGNORS TO CAMEL COMPANY, OF CHICAGO, ILLINOIS, A CORPORATION OF ILLINOIS

SIDE-DOOR CONSTRUCTION

Original No. 1,687,997, dated October 16, 1928, Serial No. 207,877, filed July 23, 1927. Application for reissue filed June 26, 1930. Serial No. 464,092.

The present invention relates to side door constructions.

More particularly the present invention relates to the doors of railway house cars of the type commonly called automobile cars. House cars for the shipment of automobiles or other bulky lading require a particularly wide door opening. Cars of this sort are commonly provided, in addition to the usual sliding door, with a secondary or supplementary door, which second or supplementary door is slidably movable to provide a door opening of extraordinary width, but which may be stationarily held when a door opening of such extraordinary width is not required. In order to lock said supplementary door in its closed position, it is common to provide a movable door jamb which may be secured to said supplementary door or may move independently of said supplementary door. In either case said jamb should be capable of movement longitudinally of the car and should have means for locking same in position. Certain types of door jamb for said supplementary doors have provided means for holding a nailing strip for the securing of grain doors such as are used in lining the car when the car is used for the purpose of carrying grain or other finely divided lading. It is common to provide the jamb of the supplementary door with latching members for latching the jamb in door closing position.

An object of the present invention is to provide a construction involving a supplementary door and a door jamb therefor, which jamb requires a minimum of kinds of fittings.

A further object is to provide a door jamb involving relatively simple parts which include castings at the top and bottom of said jamb, which castings may be identical, thereby simplifying the matter of stocking repair parts.

A further object is to provide a door jamb having socket members at its top and bottom, which socket members provide housings for latching members and which house the two extremities of a wood filler post.

A further object is to provide a door jamb of great strength, which will afford protection to the means for operating the latches above referred to.

A further object is to provide a socket member which may be used either at the top or bottom of the jamb and which when used at the bottom of the jamb permits the ready removal and replacement of the latch at the bottom of the jamb.

Further objects will appear as the description proceeds.

Referring to the drawings—

Figure 1 is a fragmentary elevational view, parts being shown in section, taken from within a house car looking toward the door thereof, illustrating an embodiment of the present invention;

Figures 2 and 3 are sectional views taken along the planes 2—2 and 3—3, respectively, in Figure 1;

Figure 4 is a perspective view of a latch housing such as is used at the top and bottom of the jamb;

Figure 5 is a top plan view of the structure shown in Figure 4;

Figure 6 is a front elevational view on an enlarged scale showing the structure illustrated in Figure 3, but with all parts removed except the lower latch housing and the wood filler post;

Figure 7 is a sectional view taken along the plane indicated by the arrows 7—7 of Figure 6;

Figure 8 is a horizontal cross-sectional view on line 8—8 of Figure 1 illustrating the application of the movable post arrangement to steel doors;

Figure 9 illustrates the bottom portion of the movable door jamb with adjacent parts of the car, the jamb being in a position such as to permit the removal and replacement of the latch at the bottom of the jamb; and Figure 10 illustrates a latch which may be used at the bottom of the jamb.

Figure 1:
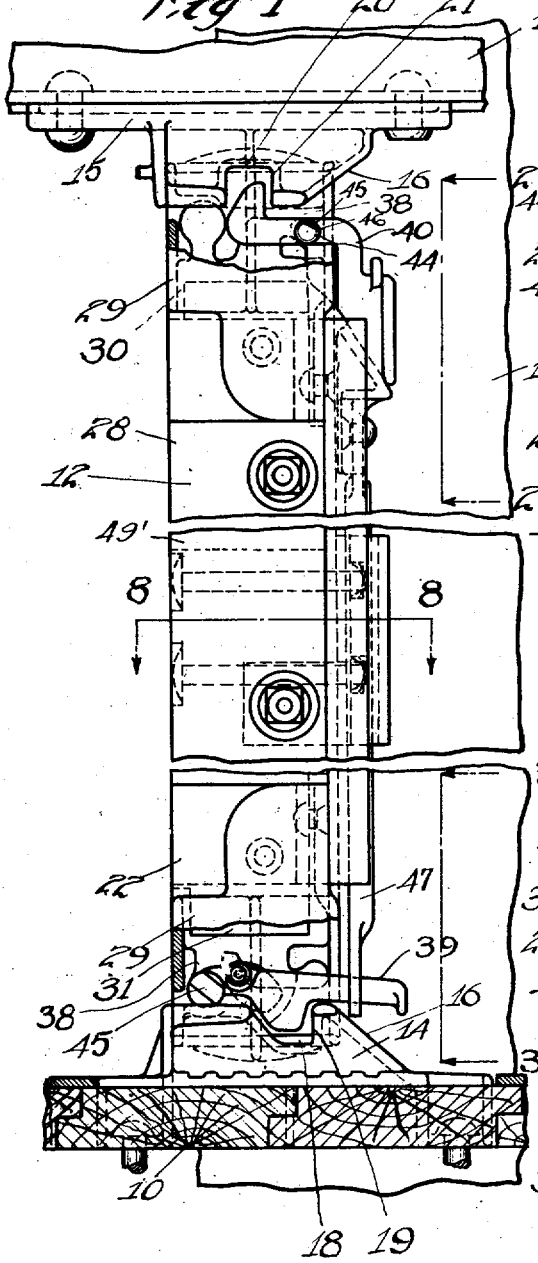
Figure 2:
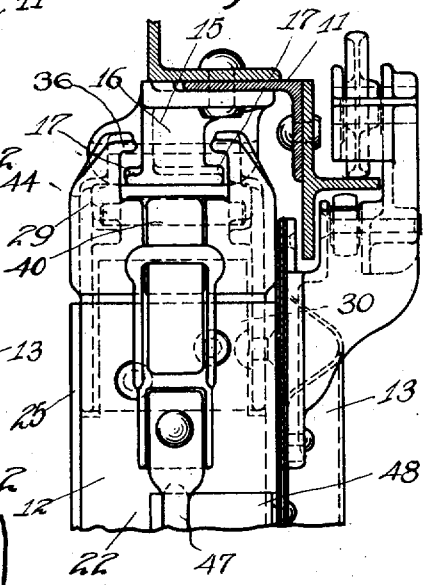
Figure 3:
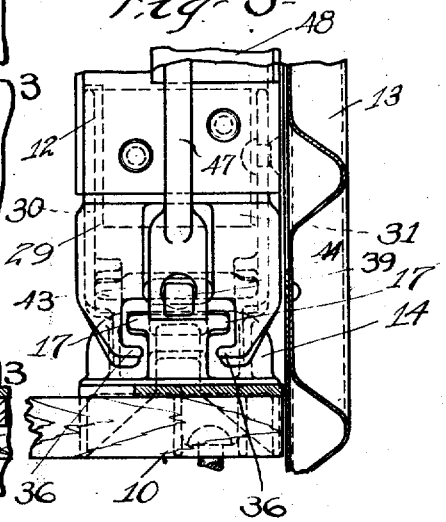

The numeral 10 indicates the side sill and the numeral 11 indicates the side plate of a railway box car. The numeral 12 indicates in its entirety a movable door jamb which in the construction illustrated is a metal jamb. Said jamb is secured to the supplementary door 13. Said jamb is adapted to be moved with a movement of translation longitudinally of the car along with said supplementary door 13. Figure 1 illustrates the jamb 12 in its home or door closing position. In this position certain latching mechanism cooperatively associated with the jamb 12 engages with detent members stationarily mounted upon the side sill and side plate of the car. The detent member associated with the side sill 10 is indicated by the numeral 14, and the detent member associated with the side plate 11 is indicated by the numeral 15, said members 14 and 15 being riveted or otherwise rigidly secured in place. It will be noted that each of the detent members 14 and 15 has the sloping portion 16, which sloping portions cooperate with the latching members carried by the jamb 12 to guide same into latching position. Each of the detent members 14 and 15 is provided with overhanging shoulders 17 on the two sides thereof, which cooperate with extending portions to be referred to hereinafter, rigidly secured to the jamb 12, whereby when said jamb 12 is in its home or door closing position, said jamb acts as a tie member to prevent spreading between the side sill 10 and the side plate 11. The detent 14 is provided on its upper surface with the recess 18 providing a square shoulder 19, and the detent member 15 is provided with the recess 20 providing the square shoulder 21, which shoulders 19 and 21 operate with latching members, to be referred to hereinafter, to hold the jamb 12 in its home or door closing position.

The jamb 12 preferably is embodied in a rolled shape 22, the cross section of which is illustrated in Figure 8. It will be noted that the rolled shape 22 is a Z-bar, the web 23 of which is disposed transversely of the car and the flange 24 of which is disposed longitudinally of the car. The other flange 25 may take the form of a reinforcing bulb 25. The Z-bar 22 has an improved section modulus over a plain angle and thereby permits the use of a relatively light weight shape, which relatively light shape has the advantages that fabrication and handling are simplified. As will be pointed out hereinafter, the flange or bulb 25 has the further advantage that it protects the operating bar of the latching mechanism of the car from damage due to shifting lading. The extremity of the flange 24 of the rolled shape 22 is inwardly bent to provide a lip 26, which provides a door guide for the main door 27.

Disposed within the reentrant angle of the rolled shape 22 is the wood filler post 28, which filler post is adapted to have a nailing strip 28A secured thereto. It will be noted that the rolled shape 22 presents a reentrant angle toward the interior of the car and toward the opening controlled by the main door 27 (see Fig. 8), this construction having the advantage that the filler post 28 and nailing strip 28A may be chamfered off, as indicated in Figure 8 by the line 28B, to provide a maximum of space to permit the clearance of hubs and fenders of automobiles inserted diagonally into the house car.

Disposed at the top and bottom of the jamb 12 are the housings or socket members 29—29, which are identical and in a preferred embodiment of the present invention take the form of castings. The wood filler post 28 is gained into said castings 29—29 at the two ends of said strip 28. Figures 4, 6, 7 and 9 show one of the castings 29 in the position it assumes when used at the bottom of the jamb 12. It will be noted that said casting 29 includes a socket portion 30 in which the filler post 28 is disposed, said filler post 28 having a reduced end portion 31 for this purpose. One wall 32 of the casting 29 is provided with a pair of holes 33—33 for the reception of rivets or bolts for securing said wall 32 to the web of the rolled shape 22. Each of the walls 34—34 adjacent to the wall 32 is provided with the hole 35. In the case of a casting 29 used at the bottom of the jamb 12, one of said holes 35 is used for receiving a rivet or bolt for securing the corresponding wall to the flange 24 of the Z-bar 22. In the case of a casting used at the top of the jamb 12, the other of said holes 35 is used for securing the corresponding wall 34 to the flange 24 of the Z-bar 22.

From an inspection of Figures 2, 3, 4, 5, 6 and 7 it will be noted that the extremity of the casting 29 spaced from the walls 32 or 34—34 is provided with the pair of lip portions 36, which extend toward one another and are adapted to have overlapping relationship with the shoulders 17—17 of the detent members 14 and 15 at the bottom and top of the car.

Referring to the sectional view illustrated in Figure 7, the inner conformation of each side wall 34 is illustrated. The two side walls 34 are identical, so that a description of one of said side walls will suffice for both. It will be noted that the inner surface of each wall 34 is provided with projections forming a pair of sockets 37 and 38, which sockets provide bearings for latching members 39 and 40 disposed, respectively, at the bottom and top of the jamb 12.

It will be noted that the socket portions 37 and 38 have restricted entrances 41 and 42, respectively. The trunnions 43 and 44 of the latch members 39 and 40, respectively, are provided with flat faces, whereby said trunnions 43 and 44 may be admitted through said entrances 41 and 42, respectively, when the latches are turned at predetermined angles. The flat faces of the trunnions 43 are indicated by the numerals 45—45. A flat face on the trunnion 44 is indicated by the numeral 46. Said flat faces 45—45 and 46 are so disposed upon the trunnions 43 and 44, respectively, that said trunnions can be removed from their corresponding socket portions 37 and 38 only when the latches 39 and 40 are disposed in an angular position which they cannot assume with the door jamb and the detents 14 and 15 in normal positions within the car and with the filler post 28 in position.

The latches 39 and 40 are connected to one another by means of the latch operating bar 47. The details of the bar 47 need not be described herein, the subject matter of a similar latch operating bar being described and claimed in the Tobin and Darrow Patent No. 1,533,621, issued April 14, 1925. It will be sufficient to state that the bar 47 causes the latching members 39 and 40 to move in unison, whereby the jamb 12 will either be in latched condition at both top and bottom, or in unlatched condition at both top and bottom, depending upon movement of said bar 47. The lower latch 39 is provided with the holding cam 47A, which forms no part of the present invention and need not be described herein.

It will be noted from an inspection of Figure 8 that the flange or bulb 25 of the Z-bar 22 is in position to protect the operating bar 47 against shifting lading within the car.

With particular reference to steel door construction, attention is directed to the reinforcing plate 48 secured along one edge to the door 13 by means of a row of rivets 49 and along its other edge to the web of the Z-bar 22 by means of a row of rivets 50. Said reinforcing plate 48 not only strengthens the construction, but prevents lading from getting into the corner between the door 13 and the web of the Z-bar 22. The front edge of the door 13 and the flange 24 are secured together by means of the row of rivets 51. The rolled shape 22, the reinforcing plate 48 and the front edge portion of the door 13 thereby form a trusswork which effectually protects the door jamb against twisting. The filler post 28 is secured to the rolled shape 22 by means of bolts 52 and 53.

Though the filler post 28 may be a permanent part of the jamb, it may be desired to remove said filler post in case said filler post becomes injured and to insert a new filler post. In order to remove said filler post 28 without requiring the dismantling of the castings 29—29 from the Z-bar 22, or removing the jamb proper from the door to which it is riveted, the filler post 28 may be cut transversely, as indicated by the numeral 49′. After removal of the holding bolts, the two extremities of the filler post 28 may be readily removed and other sections may be mounted in place, the bolts being reinserted to secure the two sections of said filler post in rigid relationship with the Z-bar 22.

As appears from the drawings, each housing or socket member 29 is open from top to bottom, this construction having the decided advantage that in case it should be necessary to remove the latch 39 at the bottom of the jamb and replace same with another, the change can be made very readily without taking the car out of service. Though the latches are ordinarily quite sturdy, breakage of the lower latch may occur if said latch is subjected to very rough treatment. To change a lower latch 39, the filler post may be removed in a manner referred to above, and the jamb may be moved to a position free of the detent 14, such for example as the position illustrated in Figure 9.

Though preferred embodiments of the present invention have been described in detail, many modifications will occur to those skilled in the art. It is intended to cover all such modifications that fall within the scope of the appended claims.

What is claimed is—

1. In a railway house car, in combination, a movable door jamb comprising a Z-bar, castings secured to the two extremities of said Z-bar, latching members carried by said castings, an operating member for causing said latches to move in unison with one another, said operating member being disposed in position to be protected by one of the flanges of said Z-bar.

2. In a railway house car, in combination, a main door, a supplementary door, a movable door jamb cooperatively associated with said supplementary door, said jamb including a Z-bar having latches at its top and bottom, an operating member for said latches disposed along the web of said Z-bar, one of the flanges of said Z-bar being disposed in protective relationship with said operating member, the other flange of said Z-bar and the web of said Z-bar presenting a reentrant angle disposed inwardly of said car and in a direction toward said main door.

3. In a movable door jamb, in combination, a structural steel shape, a pair of identical castings secured to said shape at the two extremities thereof, each of said castings comprising a housing open from top to bottom and filler post means disposed in said housings, the lower casting having a latch mounted therein, said latch being insertable into operative position within said lower casting through the top thereof and being protected against removal by said filler post means.

4. In a movable door jamb, in combination, a Z-bar having a web portion and two flanges, identical castings at the top and bottom of said Z-bar, each of said castings having a wall disposed along and secured to the web of said Z-bar, each of said castings being provided with side walls, either of which is adapted to be disposed along and to be secured to one of the flanges of said Z-bar, a latch member cooperatively associated with each of said castings, each of said castings being provided with socket portions for pivotally supporting each of said latches and wood filler post means having its end portions disposed within said castings, and an operating member for said latch members, the other flange of said Z-bar being disposed in protective relationship with said operating member.

5. A socket member adapted to be used at the top or bottom of a movable door jamb, one extremity of said socket member comprising a socket portion for receiving the extremity of a filler post, walls of said socket portion being provided with holes for securing said socket member to a door jamb, the other extremity of said socket member being provided with lips adapted to overlap the projections of a detent member disposed above the top or below the bottom of said door jamb, opposed walls of said socket member being provided with bearing portions, one of which is adapted to provide a bearing for a latching member at the top of said jamb and the other of which is adapted to provide a bearing for a latching member at the bottom of said jamb.

6. In an automobile car, in combination, a structural steel shape providing a reentrant angle, a filler post within said angle, and socket members at the top and bottom of said shape and secured thereto, said filler post being seated within said socket members.

7. In an automobile car, in combination, a movable jamb comprising a Z-bar, castings at the top and bottom of said jamb, latches pivotally disposed within said castings, and an operating bar for simultaneously unlocking said latches, one of the flanges of said Z-bars being disposed in protective relationship with said operating bar.

8. In an automobile car, in combination, a movable jamb comprising a Z-bar, castings at the top and bottom of said jamb, latches pivotally disposed within said castings, an operating bar for simultaneously unlocking said latches, one of the flanges of said Z-bars being disposed in protective relationship with said operating bar, a slidable door secured to said jamb, and a reinforcing plate disposed in angular relationship with said door and jamb and secured to said door and jamb, whereby to provide a truss construction.

9. In a movable door jamb, in combination, a housing adapted to be used either at the top or at the bottom of said jamb, said housing being open from top to bottom thereof, opposite walls of said housing being provided with recesses providing bearings for latches, said housings being provided with socket portions adapted to receive the extremity of a filler post, said socket portions providing access to said recesses.

10. In a railway house car, in combination, a movable door jamb comprising a metal member having a web extending transversely of said car, latching members carried by said jamb, and operating mechanism for said latches said jamb having a flange disposed inwardly of said car in protective relationship with said operating mechanism.

11. In a railway house car, in combination, a movable door jamb comprising a metal member having a web disposed transversely of said car and flanges extending longitudinally of said car, latching mechanism carried by said jamb, and operating mechanism for said latches, said operating mechanism being disposed in position to be protected by one of said flanges.

12. In a railway house car, in combination, a movable door jamb comprising a Z-bar having its web disposed transversely of said car, latching members carried by said jamb, and operating mechanism for said latches, said operating mechanism being disposed in position to be protected by one of the flanges of said Z-bar.

13. In a railway house car, in combination, a movable door jamb comprising a metal member having a web extending transversely of said car, a latching member carried by said jamb, and operating mechanism for said latch, said jamb having a flange disposed inwardly of said car in protective relationship with said operating mechanism.

14. In a railway house car, in combination, a movable door jamb comprising a metal member having a web extending transversely of said car, a releasable latching member for locking said door in closed position, and operating means for said latching member, said jamb having a projection disposed in protective relationship with said operating means when said member is in engaged position or in released position.

Signed at Atlantic City, New Jersey, the 24th day of June, 1930.

KENNETH J. TOBIN.
WILLIAM W. DARROW.